(12) United States Patent
Catt Lyon

(10) Patent No.: US 9,279,237 B2
(45) Date of Patent: Mar. 8, 2016

(54) FILTER FOR RAINWATER HARVESTING

(71) Applicant: Charleen Catt Lyon, Cincinnati, OH (US)

(72) Inventor: Charleen Catt Lyon, Cincinnati, OH (US)

(73) Assignee: Catt Lyon Design, Inc., Cincinnati, OH (US)

( * ) Notice: Subject to any disclaimer, the term of this patent is extended or adjusted under 35 U.S.C. 154(b) by 224 days.

(21) Appl. No.: 13/746,923

(22) Filed: Jan. 22, 2013

(65) Prior Publication Data

US 2013/0193047 A1   Aug. 1, 2013

Related U.S. Application Data

(63) Continuation-in-part of application No. 12/847,413, filed on Jul. 30, 2010, now abandoned.

(51) Int. Cl.
| | |
|---|---|
| *E03B 3/03* | (2006.01) |
| *E03B 3/02* | (2006.01) |
| *B01D 35/027* | (2006.01) |
| *B01D 29/05* | (2006.01) |
| *B01D 29/03* | (2006.01) |
| *C02F 103/00* | (2006.01) |

(52) U.S. Cl.
CPC . *E03B 3/02* (2013.01); *B01D 29/03* (2013.01); *B01D 29/05* (2013.01); *B01D 35/027* (2013.01); *E03B 3/03* (2013.01); *C02F 2103/001* (2013.01); *C02F 2303/24* (2013.01)

(58) Field of Classification Search
CPC ............. E03B 3/02; E03B 3/03; B01D 29/03; B01D 29/05; B01D 35/02; B01D 35/027; C02F 2103/001

USPC ............. 210/170.03, 172.1, 172.6, 474, 475; 220/371, 372
See application file for complete search history.

(56) References Cited

U.S. PATENT DOCUMENTS

| | | | |
|---|---|---|---|
| 1,062,650 A | | 5/1913 | Hudson |
| 1,546,230 A | * | 7/1925 | Grover et al. ................. 220/372 |
| 2,120,893 A | | 6/1938 | Frushour |
| 2,215,607 A | | 9/1940 | Eastwood |
| 2,907,491 A | | 10/1959 | Gunn |

(Continued)

OTHER PUBLICATIONS

United States Plastic Corporation, Delcon Open Head 55 Gallon Rain Barrels, Catalog Page No. P-56, 2009, U.S., website www.usplastic.com.

*Primary Examiner* — Christopher Upton
(74) *Attorney, Agent, or Firm* — Wood, Herron & Evans, LLP

(57) ABSTRACT

A filter for rainwater harvesting forms part of a rainwater catchment system, and includes a container with a lid on its top end, an opening formed in the lid, and a strainer sized and shaped to accommodate the edge of the lid that defines the opening. The strainer includes an upper outwardly directed flange which engages the lid, a vertical side wall that extends downwardly from the upper flange, a lower inwardly directed flange, a reinforcing web supported by the lower flange, a mesh also located above and supported by the lower flange, and a retainer ring located above and supported by the lower flange and adapted to be secured thereto to removably hold the mesh and the reinforcing web therebetween. When the strainer is placed within the opening in the lid and the container is located such that the opening is in the flow path of a rainwater downspout, the strainer allows the passage therethrough of rainwater and filters debris from the rainwater to thereby enable the rainwater to be harvested.

10 Claims, 4 Drawing Sheets

(56) References Cited

U.S. PATENT DOCUMENTS

| | | | |
|---|---|---|---|
| 3,384,385 A | 5/1968 | Cohen et al. | |
| 3,669,694 A | 6/1972 | Nauheimer et al. | |
| D249,115 S * | 8/1978 | Waldron | D34/4 |
| 4,279,357 A | 7/1981 | Robinson | |
| 4,290,888 A | 9/1981 | Gartmann et al. | |
| 4,320,851 A | 3/1982 | Montoya | |
| D269,643 S * | 7/1983 | Hartman et al. | D34/7 |
| 4,630,752 A | 12/1986 | DeMars | |
| 5,190,157 A | 3/1993 | Przytulla | |
| 5,252,204 A * | 10/1993 | Chiodo | 210/232 |
| 5,407,091 A | 4/1995 | Wallis | |
| 5,531,888 A | 7/1996 | Geiger et al. | |
| 5,607,075 A | 3/1997 | Burgdorf et al. | |
| 5,730,179 A | 3/1998 | Taylor | |
| D393,693 S * | 4/1998 | Schollen et al. | D23/202 |
| 5,918,757 A | 7/1999 | Przytulla et al. | |
| 5,935,435 A | 8/1999 | Hasler | |
| 6,247,600 B1 | 6/2001 | Sullivan, Jr. | |
| 6,537,446 B1 | 3/2003 | Sanguinetti | |
| 7,025,076 B2 | 4/2006 | Zimmerman, Jr. et al. | |
| 7,025,879 B1 * | 4/2006 | Ticknor | 210/474 |
| 8,097,151 B2 | 1/2012 | Allan | |
| 2001/0032822 A1 * | 10/2001 | Koslow et al. | 210/473 |
| 2005/0092667 A1 * | 5/2005 | Wade | 210/163 |
| 2005/0252079 A1 | 11/2005 | Richter | |
| 2009/0065504 A1 * | 3/2009 | Vos et al. | 220/212 |
| 2010/0147845 A1 * | 6/2010 | Wallace et al. | 220/694 |
| 2011/0084070 A1 * | 4/2011 | Martheenal | 220/200 |

* cited by examiner

FILTER FOR RAINWATER HARVESTING

CROSS-REFERENCE TO RELATED APPLICATION

This application is a continuation-in-part application of U.S. patent application Ser. No. 12/847,413, filed Jul. 30, 2010, the disclosure of which is incorporated by reference herein in its entirety.

BACKGROUND AND SUMMARY OF THE INVENTION

This invention relates to a rainwater catchment system for filtering rainwater before it enters the rain barrel. This invention allows the user to customize the filtration media as needed This invention provides a simple inexpensive solution for adapting a variety of food-grade plastic drums into an effective and efficient rain barrels, for harvesting rainwater.

According to one preferred embodiment of the invention, a filter for rainwater harvesting forms part of a rainwater catchment system, and includes a container with a lid on its top end, an opening foil ied in the lid, and a strainer sized and shaped to accommodate the edge of the lid that defines the opening. The strainer includes an upper outwardly directed flange which engages the lid, a vertical side wall that extends downwardly from the upper flange, a lower inwardly directed flange, a reinforcing web supported by the lower flange, a mesh also located above and supported by the lower flange, and a retainer ring located above and supported by the lower flange and adapted to be secured thereto to removably hold the mesh and the reinforcing web therebetween. When the strainer is placed within the opening in the lid and the container is located such that the opening is in the flow path of a rainwater downspout, the strainer allows the passage therethrough of rainwater and filters debris from the rainwater to thereby enable the rainwater to be harvested.

The design of the strainer, which in some respects could also be characterized as a basket, includes an outwardly extending flange, or rim at the top, which allows it to adapt to different types of containers for rainwater harvesting. The bottom of the strainer, particularly the inwardly directed lower flange, has holes that allow for significant interchangeability of the mesh and the reinforcing web. More specifically, a simple hardware kit enables a range of different filter meshes and reinforcement webs to be quickly changed out at the bottom of the strainer.

The strainer is preferably sized to easily fit onto the top of a large plastic drum, which is part of adapting the typical 55-gallon drum to become a rain barrel. According to further considerations, the size of the strainer is small enough to fit between the bungholes of a conventional 55-gallon drum, or the retainer ring of a bulk olive barrel. Preferably, the strainer's wide brim fits snugly to the lid of the barrel, so as to prevent debris and insects from entering the barrel.

It is contemplated that the grade of the mesh is mosquito-proof, to prevent mosquitos from entering the barrel. Such meshes are usually so fine that they also prevent mosquito eggs from being washed into the collection vessel, from the gutter above.

The reinforcing web is sufficiently rigid so as to reinforce the mesh and to provide additional structure to handle heavy water flows. The finer mesh enables the flowing water to flow more smoothly into the vessel, while keeping finer debris out of the barrel.

Multiple layers of mesh and reinforcing webs can be coupled together to create a more sophisticated filter, which can employ sand, and/or granular activated carbon.

The strainer is capable of being made from a combination of molded and flat plastic parts. Also, the strainer can be made via a variety of different methodologies, based on the quantity needed. For example, injection molding would be one preferred methodology for making runs of 10,000 or more. Thermo-forming would perhaps be more suitable for runs of 10,000 or less, while 3D printing may be suitable for less than 100 at a time.

A variety of plastics are appropriate for this product, such as polypropylene, which holds up well in exterior conditions.

The various mesh filters can be made of extruded polypropylene as separate pieces, so they can be interchangeable. The extruded plastic mesh can be a readily available commodity manufactured in large quantities. For this product, the desired mesh filters could be die-cut from a pre-existing product.

The hardware kit could be polypropylene nuts and bolts.

Thus, this invention facilitates the simple and relatively inexpensive harvesting of rainwater, as a supplemental source of water primarily for garden uses or other appropriate uses.

DETAILED DESCRIPTION OF THE DRAWINGS

Figure 1:
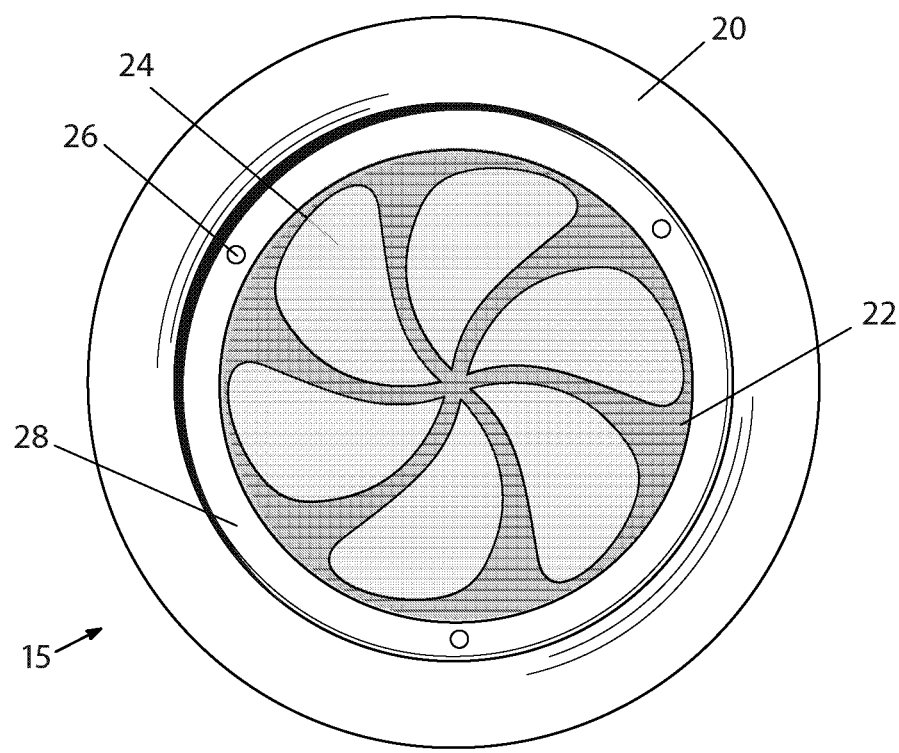
FIG. 1 is a top view of a strainer that forms part of the rainwater catchment system, according to a first preferred embodiment of the invention.
Figure 2:
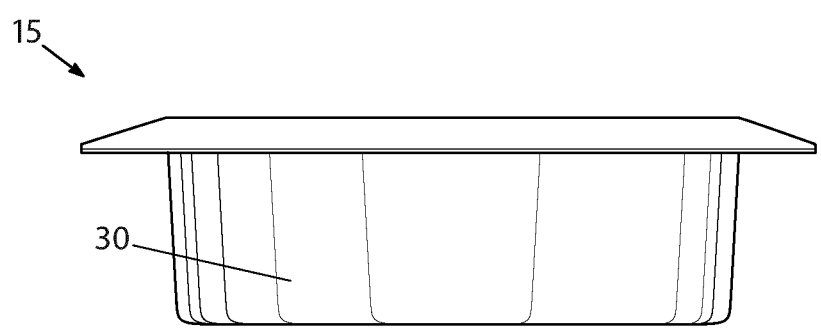
FIG. 2 is a side view of the basket shown in FIG. 1.

FIGS. 1 and 2 show a strainer 15 with an upper outwardly extending flange 20 that is sized to fit within an opening of a lid (not shown). FIG. 2 shows the vertically oriented circular side wall 30 of the strainer 15, while FIG. 1 shows a reinforcing web 22 aligned with a mesh 24, both of which are preferably held in place by bolts (not shown) that extend through bolt holes 26 formed in a retainer ring 28.

Figure 3:
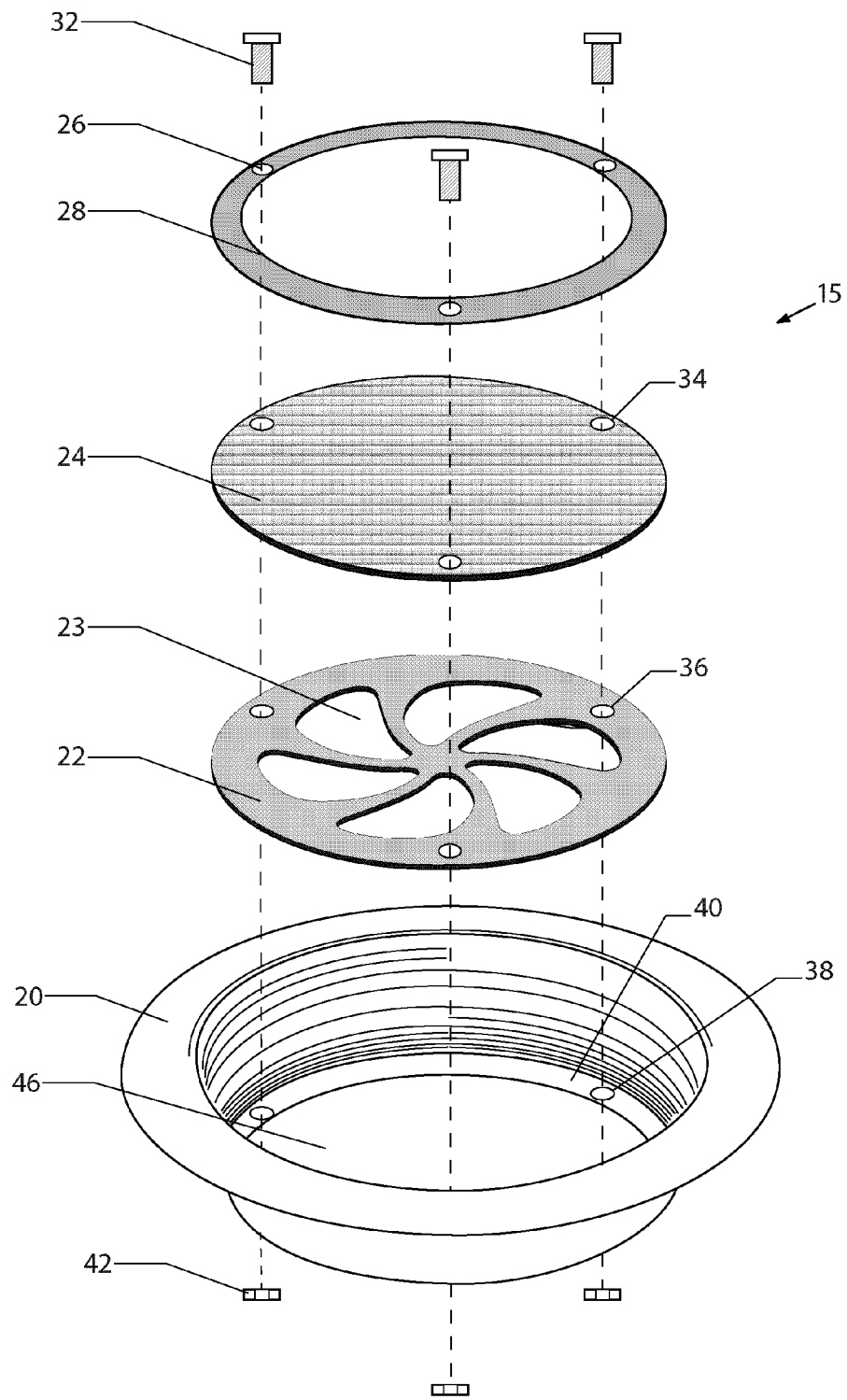
FIG. 3 is an exploded view of the strainer shown in FIGS. 1 and 2.

FIG. 3 shows, in exploded view, that the bolts 32 extend through holes 26 in the retainer ring 28, then downwardly through corresponding holes 34 in the mesh 24, then through holes 36 in the reinforcing web 22, and then through holes 38 in a lower inwardly directed flange 40 of the strainer 15, with the bolts 32 being held by a like number of nuts 42 below the lower flange 40.

FIG. 3 shows that the reinforcing web 22 includes a plurality of openings 23. These openings 23 in FIG. 3 are pedal shaped and arranged symmetrically with respect to the center of the web 22. Those skilled in the art will recognize that the shape and arrangement of the openings 23 may be varied, so long as they provide a sufficient amount of open flow space. The web 22 reinforces the mesh 24, and preferably sandwiches the mesh 24 along with the retainer ring 28. All of these components are aligned with a relatively large opening 46 defined by the lower flange 40.

Figure 4:
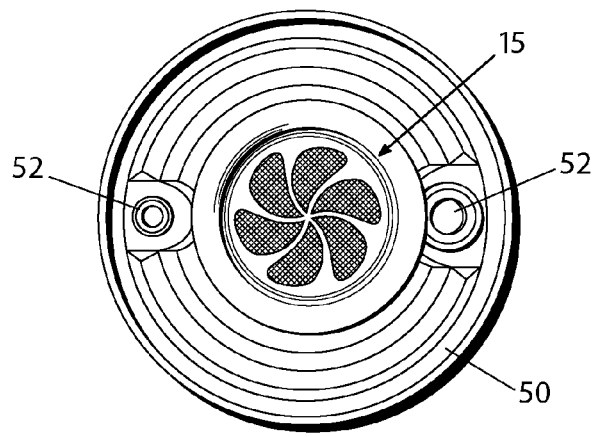
FIG. 4 is a top view of the strainer residing within an opening in the lid of a 55-gallon plastic drum.

FIG. 4 shows a top view of the strainer 15, with the strainer 15 located within the center of a lid 50 of a drum (not shown).

FIG. 4 shows that the upper flange 20 preferably resides radially inside of the two bungholes 52 of the lid 50.

Figure 5:
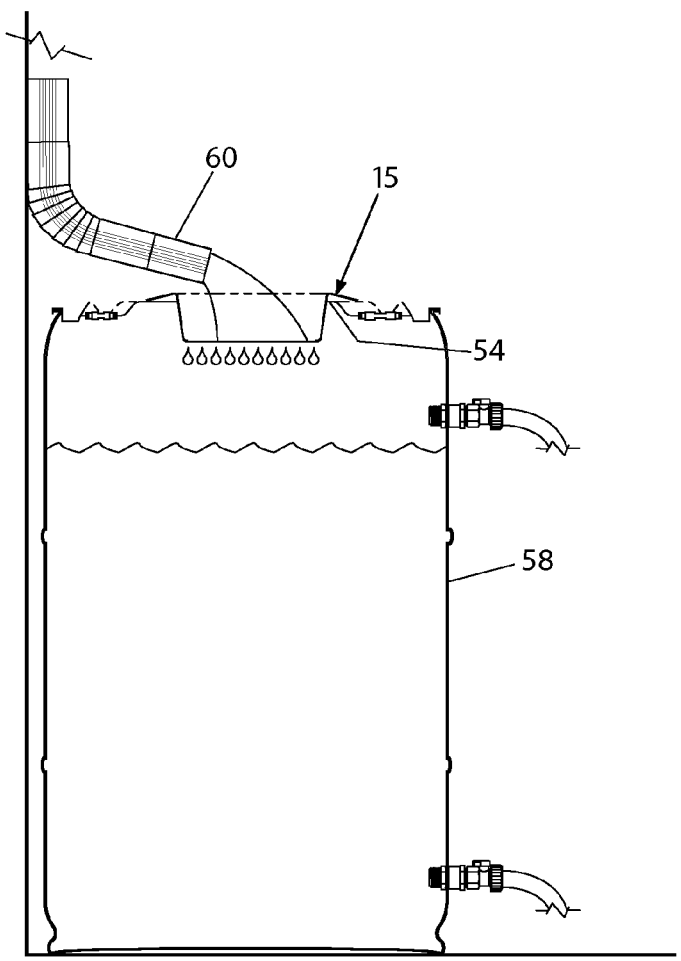
FIG. 5 is a sectional schematic Section view of the strainer nested in the drum, with the drum located near a downspout.

FIG. 5 schematically shows the strainer 15 recessed within an opening 54 of the lid 50 of a barrel 58 that is located in the flow of water from a downspout 60, for rainwater harvesting. The basket 15 may be more rigidly is secured to the lid 50 with Velcro strips or hardware. Either option would keep[s] the basket 15 more securely affixed to the lid 50, yet enable[s] the basket 15 to be removed when necessary. Thus, the basket 15 can easily be lifted out of the lid 50, cleaned, and if necessary the mesh 24 or the web 22 can be replaced.

As shown in FIG. 5, [a] the downspout 60, has an elbow that directs water to the basket 15. When it rains, water flows off the roof, into the gutter and through downspout 60 into the strainer basket 15, which filters the water prior to draining into the barrel 58.

The rainwater, which may be washing down leaves, twigs, and other debris, is filtered as it flows through the mesh 22 of the strainer 15. The bottom of the strainer 15 is reinforced with the relatively rigid web 22, which strengthens the basket 15 and helps prevent ruptures in the mesh 24, which is in the nature of a screen. As the rainwater pours into the basket 15, the mesh 24 of the strainer 15 also diffuses the water, thereby minimizing splash back.

Preferably, the strainer 15 uses a fine mesh 22 that is, capable of preventing mosquito eggs from being washed into the rain barrel 58. The mesh 22 is also fine enough to prevent flying mosquitos from entering the collection vessel 58.

Figure 6:
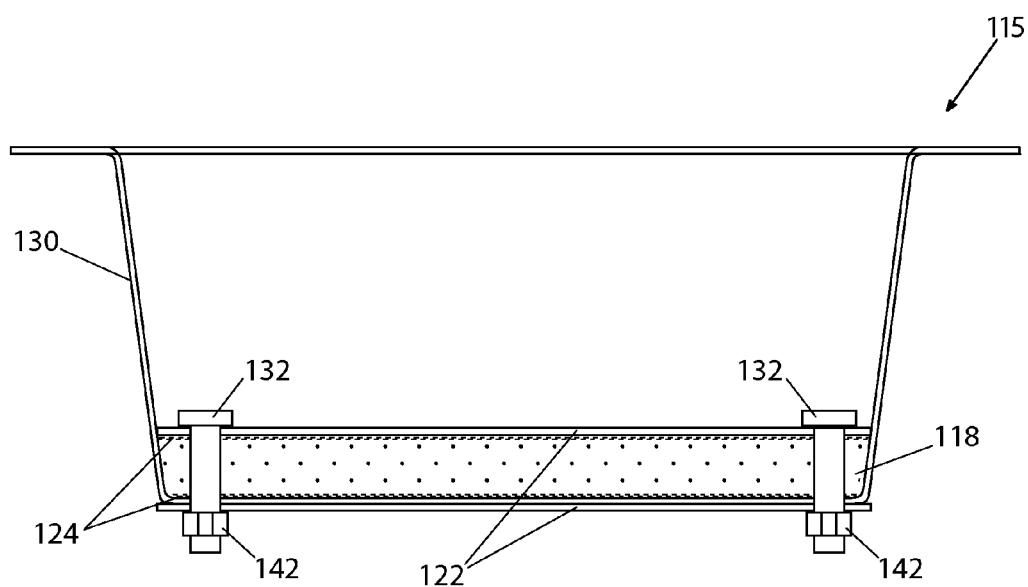
FIG. 6 is a section view of a strainer for a rainwater catchment system according to a second preferred embodiment of the invention.

Depending on local conditions and the desired water quality, an even finer mesh than mosquito-grade mesh, can be used. According to another preferred embodiment of the invention, as shown in FIG. 6, the strainer 115 is modified at its lower end, so that a layer of sand or granular activated carbon (GAC) 118 is sandwiched, between upper and lower meshes 124 which are in turn sandwiched between upper and lower webs 122, for finer filtration.

The benefits of this design are numerous. The flexibility and modularity of the design, enable the user to customize the filter for their specific needs.

All the parts are replaceable. If the mesh 24, 124 wears out, the whole strainer 15, 115 does not have to be replaced, just the mesh 24, 124 or the web 22, 122 has to be replaced.

The simplicity of how the components fit together makes it possible for quick assembly in the field. The user does not need any power tools to assemble this system.

The parts are very light weight and nest together, thereby saving space and minimizing shipping costs.

The design of the strainer 15 keeps mosquitoes out of the collected rainwater. Many rain barrels 58 do not have mosquito protection and rely on the user having to add chemicals to kill mosquito eggs. This invention eliminates that need.

The depth of the strainer 15 allows water to pool, while it is being strained, which ensures the maximum amount of water is captured. Many rain barrels 58 do not provide a collection chamber, so that during a heavy downpour, much of the water runs off before it can be captured.

The strainer 15 screens out debris such as dead leaves, twigs and aggregate from deteriorating asphalt shingles. Because the strainer 15 is so easy to remove, it is easy to clean.

Most rain barrels 58, do not provide an easy way to screen debris, much less provide a cleanable and replaceable filter. Keeping the water cleaner as it goes into the barrel 58 makes it easier to keep the barrel 58 clean.

I claim:

1. A rainwater catchment system comprising:
    a container having a top end;
    a lid sized to cover the top end, the lid having an opening formed therein defined by an edge; and
    a strainer further comprising:
        an upper outwardly directed flange;
        a vertical side wall extending downwardly from the upper flange;
        a lower inwardly directed flange located at the bottom of the vertical side wall;
        a reinforcing web located above and supported by the lower flange;
        a mesh also located above and supported by the lower flange; and
        a retainer ring also located above and supported by the lower flange and adapted to be secured thereto so as to removably hold the mesh and the reinforcing web therebetween;
    wherein the strainer is removably held by the lid over the opening, and sized and shaped to accommodate the edge of the lid that defines the opening,
    wherein the mesh is located below the opening formed in the lid, the mesh adapted to allow the passage therethrough of rainwater and to filter debris from the rainwater when the container is located such that the opening is in the flow path of a rainwater downspout.

2. The rainwater catchment system of claim 1 wherein the upper flange, the side wall, and the lower flange are integrally formed.

3. The rainwater catchment system of claim 1 wherein the mesh is secured to at least one of the upper and the lower surfaces of the reinforcing web.

4. The rainwater catchment system of claim 1 wherein the opening and the strainer are circular in shape, and the opening is offset with respect to a center vertical axis of the container.

5. The rainwater catchment system of claim 1 wherein the opening is circular in shape, and the flange is also circular in shape and sized to extend over the edge of the opening about its entire periphery.

6. The rainwater catchment system of claim 1 wherein the reinforcing web includes radially directed spokes.

7. The rainwater catchment system of claim 6 wherein the radially directed spokes are curved and define a flower petal shape.

8. The rainwater catchment system of claim 1 wherein the container is one of the following: a conventional 55-gallon plastic drum and a 35-gallon metal trashcan.

9. The rainwater catchment system of claim 1 wherein the mesh is mosquito egg proof.

10. The rainwater catchment system of claim 1 and further comprising:
    means for holding the retainer ring to the lower flange with the mesh and the reinforcing web held therebetween.

* * * * *